(12) United States Patent
Vana (10) Patent No.: US 11,858,659 B2
(45) Date of Patent: Jan. 2, 2024

(54) INTEGRATED PUSHBACK GUIDANCE SYSTEM AND METHOD

(71) Applicant: Borealis Technical Limited, North Plains, OR (US)

(72) Inventor: Jan Vana, Prague (CZ)

(73) Assignee: BOREALIS TECHNICAL LIMITED, Isle of Man (IM)

( * ) Notice: Subject to any disclaimer, the term of this patent is extended or adjusted under 35 U.S.C. 154(b) by 185 days.

(21) Appl. No.: 17/326,102

(22) Filed: May 20, 2021

(65) Prior Publication Data

US 2021/0362878 A1    Nov. 25, 2021

Related U.S. Application Data

(60) Provisional application No. 63/027,626, filed on May 20, 2020.

(51) Int. Cl.
| | | |
|---|---|---|
| *B64F 1/12* | (2006.01) | |
| *B64D 45/00* | (2006.01) | |
| *B64C 25/40* | (2006.01) | |
| *B64F 1/22* | (2006.01) | |
| *B64C 25/32* | (2006.01) | |

(52) U.S. Cl.
CPC .............. *B64F 1/12* (2013.01); *B64C 25/405* (2013.01); *B64D 45/00* (2013.01); *B64F 1/228* (2013.01)

(58) Field of Classification Search
CPC .............. B64F 1/002; B64F 1/12; B64F 1/18
See application file for complete search history.

(56) References Cited

U.S. PATENT DOCUMENTS

| | | | |
|---|---|---|---|
| 6,762,694 B2 | 7/2004 | Westlund | |
| 9,284,065 B2 | 3/2016 | Millgård | |
| 2006/0065779 A1* | 3/2006 | McCoskey | ................ B64F 1/28 244/100 R |

FOREIGN PATENT DOCUMENTS

EP    3079136 A1    12/2016

OTHER PUBLICATIONS

ADB Safegate, "ADB Safegate Safedock A-VDGS Video", May 1, 2017, https://www.youtube.com/watch?v=TLT4EgbzJGs (Year: 2017).*

(Continued)

*Primary Examiner* — Timothy D Collins
*Assistant Examiner* — Terri L Filosi (57) ABSTRACT

An integrated pushback guidance system and method is provided for guiding pushback travel of electric taxi system-driven aircraft. The pushback guidance system may be integrated with existing ramp monitoring systems to monitor reverse pushback travel of pilot-controlled electric taxi system-driven aircraft along an optimum pushback path from a stand to a pushback end location. Visual signals relating to pushback travel safety as the pilot drives the aircraft along the pushback path are generated in real time by the system and transmitted to a range of display devices viewable by the aircraft pilot and airport personnel responsible for guiding aircraft pushback. The pilot may be guided by visual signals on only display devices or with guidance from airport personnel also viewing the visual signals on display devices to drive the aircraft safely in reverse with the electric taxi system along the pushback path to the pushback end location.

10 Claims, 3 Drawing Sheets

(56) References Cited

OTHER PUBLICATIONS

Airside International, "DAB Safegate Launches new Safedock X A-VDGS", May 15, 2019, https://www.airsideint.com/issue-article/adb-safegate-launches-new-safedock-x-a-vdgs/ (Year: 2019).*

ADB Safegate launches pushback support tool, Sep. 26, 2017, https://blog.adbsafegate.com/adb-safegate-launches-pushback-support-tool-to-improve-airport-throughput-and-enhance-apron-safety/.

Stevens, Kim, ADB Safegate enhances visual docking guidance system to help eliminate gate congestion and increase capacity, Oct. 9, 2017, https://stateaviationjournal.com/index.php/international-news/adb-safegate-enhances-visual-docking-guidance-system-to-help-eliminate-gate-congestion-and-increase-capacity.

Gellaboina et al., Aircraft push back direction Indicator, 2013 IEEE International Conference on Image Processing, https://ieeexplore.ieee.org/document/6738939.

Tange, N.J.C., The Effect of Pushback Accuracy on Static Apron Capacity at AAS, Jun. 30, 2017, (See Summary, Chapter 9), http://resolver.tudelft.nl/uuid:cec61bd9-1273-4864-8847-42958e5963c0.

* cited by examiner

INTEGRATED PUSHBACK GUIDANCE SYSTEM AND METHOD

TECHNICAL FIELD

The present invention relates generally to improvements in safety and efficiency of pushback of aircraft from airport gate parking locations and specifically to an integrated pushback guidance system and method for aircraft driven with electric taxi drive systems during pushback.

BACKGROUND OF THE INVENTION

Most airports, especially large airports, currently simultaneously handle large numbers of arriving and departing aircraft of a range of different sizes and body types moving into and out of apron or ramp areas adjacent to airport terminals. The successful management of a large volume of aircraft ground traffic requires careful control of all aircraft ground movement, particularly the movement of departing aircraft. Aircraft parked at an airport terminal gate are typically positioned in a perpendicular orientation with the nose of the aircraft facing the airport terminal. Upon departure, the aircraft must move in reverse and make one or more turns before reaching a taxiway prior to taxiing on a runway to takeoff. Arriving aircraft are moving in a forward direction and turning as required to travel from runways to gates and parking locations as departing aircraft are leaving gates. Departing aircraft must be maneuvered carefully in a reverse direction in the airport ramp area to avoid not only incoming aircraft traveling toward the gates, but also baggage carriers, tugs, and other airport ground vehicles and ground service equipment on the trip between the gate and the taxiway.

At the present time, aircraft leaving a gate or parking location in an airport ramp area are pushed in a reverse direction by a tow vehicle or tug that temporarily connects to the aircraft nose landing gear. Once attached to the aircraft, the tug pushes the aircraft in the reverse direction for a distance required to clear the gate to a location outside the ramp area where the main engines can be turned on. The tug is then detached from the aircraft so the aircraft can taxi forward to a runway for takeoff and the tug can return to the ramp to push another aircraft back. The movement of tugs, which must be monitored to keep track of their locations so they may be moved to push back the next departing aircraft, contributes to ground vehicle traffic and potential collision obstacles in airport ramp areas. The current pushback process is time-consuming and may significantly increase the time aircraft spend on the ground.

Although aircraft may be moved in reverse from a parked position out of an airport ramp area with engines set to reverse thrust, this procedure is rarely, if ever, used at busy airports. An aircraft engine operating in reverse thrust may pull foreign object debris (FOD) from the aircraft's environment into the engine and throw it forward, usually in the direction of the gate or airport terminal. The potential for injury to ground personnel, ground vehicles, and airport structures from FOD and also from jet blast from an operating engine can be significant. The use of reverse thrust is prohibited for jet engines at most airports and may be permitted for use only by turboprop aircraft. Dependence on the use of a departing aircraft's main engines is neither a safe nor an efficient push back procedure.

During the pushback process, airport ground crew are typically assigned to attach and detach tugs and to monitor and direct reversing aircraft to ensure that no part of an aircraft structure will impact any fixed object or other aircraft or vehicle and to communicate with the pilot or another aircraft cockpit crew member. The efficiency and speed with which pushback can be conducted may depend on the availability of ground personnel as well as the availability of tow bars and tugs.

The efficiency and speed of aircraft pushback operations may, in addition, be adversely affected by the ground congestion found in most large airport ramp or apron areas. Multiple aircraft are simultaneously arriving and departing, ground-based service and support vehicles and personnel are servicing parked aircraft, and ground crews are directing the arriving and departing aircraft into and out of gates. In addition, the entrances and exits between taxiways and these congested ramp areas may themselves become congested as the multiple aircraft move into and out of ramp areas to park and transfer passengers and cargo. This strains not only the available towing equipment, but also the available ground personnel. Aircraft turnaround times may be increased significantly when tow bars, adapters, tugs, or ground crew personnel are not available for pushback when needed. Neither the airline nor the flight crew currently has any control over this situation.

Driving an aircraft on the ground during taxi with pilot-controlled landing gear wheel-mounted electric taxi or other drive systems without reliance on operation of the aircraft's main engines or the use of tow vehicles has been proposed by Applicant and others. The pilot controls operation of the electric taxi drive system to maneuver an arriving aircraft without engines and tugs forward into a ramp area gate and then to maneuver a departing aircraft without engines and tugs in reverse to push back from the gate and drive the aircraft to a taxiway or runway. The resulting increased pilot situational awareness is likely to improve aircraft ground travel safety, particularly during pushback in a crowded ramp area. Additional monitoring of the ground level environment external to the portions of the aircraft not readily visible to the pilot or crew driving the aircraft and analysis of the data obtained, however, would further improve pilot situational awareness during pushback. This would avoid potential collisions and enhance safe operation of departing aircraft as they are driven in reverse with pilot-controlled electric taxi drive systems during pushback out of airport ramp areas. Facilitating pushback monitoring and guidance of electric taxi drive system-powered aircraft by ground personnel and air traffic control personnel may also help to avoid potential collisions and enhance safe ramp operations.

Monitoring an aircraft's external environment during an accelerated pushback process as a pilot drives the aircraft out of a ramp area with electric taxi drive systems with different types of sensing devices mounted on the aircraft exterior has been proposed by Applicant. While this may monitor the exterior environment adjacent to an aircraft during pushback and improve the pilot's situational awareness, it may not provide all of the information needed to guide the pilot to drive the electric taxi drive system-equipped aircraft safely out of a crowded and congested ramp area.

Systems are available that monitor and guide progress of arriving aircraft into airport apron or ramp areas and manually or automatically dock the arriving aircraft at assigned stands. Systems or methods that monitor and guide progress of reverse travel for departing aircraft powered only by electric taxi systems during pushback from stands out of ramp areas are not available, however.

A need exists for an integrated pushback guidance system and method that monitors an airport ramp area and manually or automatically guides a pilot driving an aircraft equipped with electric taxi drive systems and optimizes safety during pushback travel of the electric taxi system-driven aircraft from a stand or gate parking location out of the ramp area.

SUMMARY OF THE INVENTION

It is a primary object of the present invention, therefore, to provide an integrated pushback guidance system and method that monitors an airport ramp area and manually or automatically guides a pilot driving an aircraft equipped with electric taxi drive systems to optimize safety during pushback travel from a stand or gate parking location out of the ramp area.

It is another object of the present invention to provide an integrated pushback system capable of both scanning an airport ramp area while an aircraft is driven in reverse with an electric taxi drive system out of a gate and guiding aircraft travel during pushback safely along an optimum pushback path to a pushback end location.

It is another object of the present invention to provide an integrated pushback system that obtains and integrates information relating to travel of an electric taxi system-driven aircraft during pushback from multiple sources located on and off the aircraft.

It is an additional object of the present invention to provide an integrated pushback system that constantly transmits pushback travel information for an electric taxi system-driven aircraft in real time to the aircraft cockpit and to selected locations outside the aircraft as the aircraft is driven with the electric taxi systems from an airport parking location through the airport ramp area during pushback.

It is a further object of the present invention to provide an integrated pushback system that includes one or a plurality of displays visible from an electric taxi system-driven aircraft cockpit with information relating to progress and safety of the electric taxi system-driven aircraft during pushback as the aircraft is driven in reverse with the electric taxi system through an airport ramp area.

It is yet a further object of the present invention to provide an integrated pushback method that safely and efficiently guides and monitors progress of an electric taxi system-driven aircraft along an optimum pushback travel path between an airport parking location and a pushback end location outside the airport ramp area.

In accordance with the aforesaid objects, an integrated pushback guidance system and method are provided that guide and monitor pushback progress of an electric taxi system-driven aircraft from an airport parking location through the airport ramp area to a pushback end location to improve safety and efficiency of pushback travel of the electric taxi system-driven aircraft. The integrated pushback guidance and monitoring system may include monitoring devices positioned in locations on or near gate or terminal structures at the airport where these devices may scan a maximum portion of the ramp area likely to affect pushback travel of the electric taxi system-driven aircraft and monitor pushback progress of the electric taxi-system driven aircraft. The integrated pushback guidance and monitoring system may also include defined safety zones within the airport ramp area, a processor and software to receive and analyze pushback information from the monitoring devices and to produce visual signals to guide pushback, and information displays in locations on and off the aircraft. The information displays receive the visual signals and communicate safe or unsafe pushback progress to the aircraft pilot and to airport personnel responsible for guiding pushback so that safe pushback progress can be continued or unsafe pushback progress can be altered to make it safe or, if necessary, stopped.

The integrated pushback guidance and monitoring method of the present invention monitors the ramp area and progress of the electric taxi system-driven aircraft within the ramp area as it pushes back and is driven in reverse by the pilot with the electric taxi drive systems along an optimum pushback path and produces visual signals with safety information to guide pushback travel. The visual signals may be provided to pilot-accessible and viewable display devices and to display devices accessible by airport personnel responsible for guiding aircraft pushback. Visual and audible warning signals may be provided by the display devices to inform the pilot and others with access to the display devices to guide the electric taxi system-driven aircraft so the pilot can drive the aircraft safely in reverse along the optimum pushback path from a ramp parking location to a pushback end location.

Additional objects and advantages will be apparent from the following description, claims, and drawings.

DESCRIPTION OF THE INVENTION

Maximizing the efficiency of aircraft pushback to reduce the time an aircraft spends on the ground continues to receive attention from airlines and airports. While specific estimates vary, it is generally agreed that even a minute saved during aircraft turnaround may produce substantial annual cost savings. Consequently, turnaround procedures, including pushback, that achieve turnaround time reductions are of great interest to airport and airline operators. As noted above, airport ramp areas are often very congested places, and moving aircraft safely through them during pushback is of critical importance.

In the most commonly used aircraft turnaround process, an arriving aircraft may be towed or powered by thrust from a main engine into a parking location or stand to park near an airport terminal structure. When a departing aircraft is cleared for pushback, a tug may be attached to the aircraft nose landing gear, or may lift the nose landing gear, and the tug then pushes the aircraft in reverse away from the parking location through the ramp area as the aircraft is being turned to a location where the tug may be detached from the aircraft and the aircraft main engines may be safely started to drive the aircraft to a takeoff runway. When aircraft are equipped with landing gear wheel-mounted drive systems to power ground travel without reliance on aircraft engines and tugs, like the electric taxi drive systems described herein, tugs are not needed for pushback, and a pilot of the equipped aircraft can activate the electric taxi drive systems and drive the aircraft in reverse to push back from a parking location to a pushback end location. This pushback process requires significantly less time than a pushback process conducted with a tug or tow vehicle.

The terms "ramp" and "ramp area" will be used herein to refer to the airside area at an airport that is intended to accommodate aircraft for the loading and unloading of passengers, mail, cargo, fueling, parking, or maintenance. The term "ramp" is synonymous with the term "apron," which is also used to identify this area at an airport.

The terms "airport terminal" and "terminal" include an airport terminal building and like structures, whether or not attached to a terminal building. The terms "parking location," "gate," and "stand" all are used to refer to places where aircraft are parked at or near an airport terminal. Aircraft may be parked at parking locations with or without passenger loading bridges.

The "optimum pushback path" referred to herein may vary for aircraft within a ramp area and from ramp area to ramp area, depending, in part, on the configuration of the ramp area, numbers of aircraft and ground service vehicles and equipment in the ramp when an aircraft is being pushed back, the aircraft's parking location and orientation to the terminal, and other considerations.

"Electric taxi drive systems" and "electric taxi systems" are used interchangeably to refer to pilot-controllable landing gear wheel-mounted drive systems used to drive aircraft independently of and without reliance on operation of aircraft main engines and tugs or external tow vehicles. Electric taxi drive systems may include landing gear wheel-mounted electric drive motors, gear or roller traction drive systems, clutches, and other components activatable to power landing gear wheels and drive the aircraft during ground travel in response to pilot control. An example of one electric taxi drive system developed by Applicant to drive an aircraft during ground travel without reliance on operation of the aircraft's main engines or attachment to tugs is described in commonly owned U.S. Pat. No. 10,308,352, the disclosure of which is fully incorporated herein in its entirety by reference. Other drive systems using drive motors that are not electric, including, for example, hydraulic or pneumatic drive motors, may also drive aircraft in connection with the integrated pushback guidance system and method of the present invention and are contemplated to be included within the terms "electric taxi drive systems." An electric taxi drive system may be mounted completed within a volume defined by walls of a landing gear wheel in one or more nose or main landing gear wheels. In a preferred embodiment, electric taxi drive systems are mounted completely within defined wheel wall volumes in both nose landing gear wheels and are controlled by a pilot or flight crew from the aircraft cockpit with controls designed to operate the electric taxi drive system, power the nose landing gear wheels, and drive the aircraft in a forward direction and in a reverse direction during ground travel without reliance on the aircraft's main engines and external assistance from tugs.

The present invention may be most effectively implemented when one or more, and preferably a plurality of the aircraft landing, moving on the ground within ramp areas, and taking off from an airport terminal are equipped with the pilot-controllable landing gear wheel-mounted electric taxi drive systems described herein. Electric taxi drive system-equipped aircraft can be driven into an airport ramp area without the hazards associated with jet blast or engine ingestion. Electric taxi drive system-equipped aircraft can also maneuver freely into and out of parking locations without external assistance. When a significant number of aircraft at an airport are equipped with landing gear wheel-mounted electric taxi drive systems and the integrated pushback guidance system and method of the present invention are implemented at the airport, ramp operations safety, aircraft traffic flow efficiency, and aircraft turnaround efficiency may be significantly improved.

Figure 1:
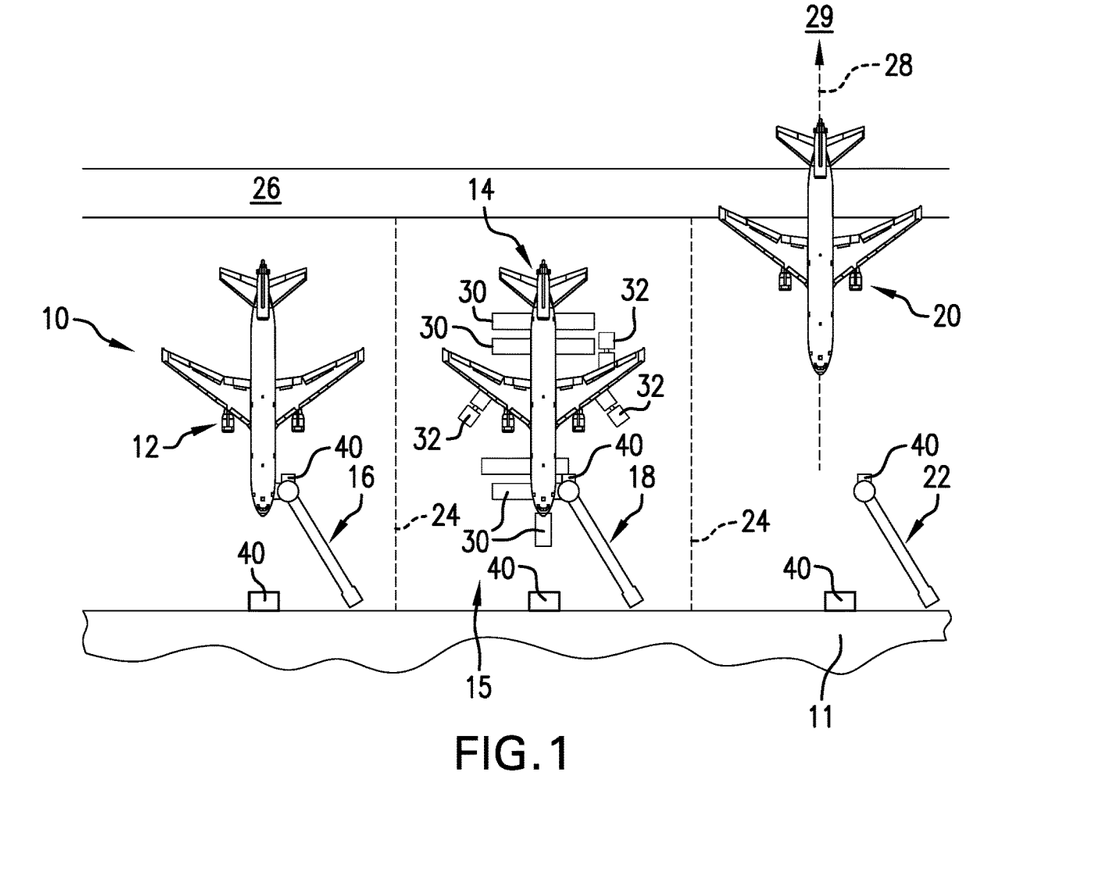
FIG. 1 illustrates a portion of an airport apron or ramp area with aircraft parked and connected to a terminal building through passenger loading bridges and an electric taxi system-driven aircraft being guided during an initial portion of pushback with the integrated pushback guidance system of the present invention.

Referring to the drawings, which are not drawn to scale, FIG. 1 illustrates a portion of an airport apron or ramp area 10 with three aircraft parked and connected to an airport terminal building 11 through passenger loading bridges and an electric taxi system-driven aircraft being guided during an initial portion of pushback with the integrated pushback guidance system of the present invention. In FIG. 1, two aircraft, 12 and 14, are shown parked at stands connected to the terminal building 11 through respective passenger loading bridges 16 and 18. A third aircraft 20 is in the process of being guided to push back from the terminal 10 with the integrated pushback system and method of the present invention. The passenger loading bridge 22 where this aircraft was docked is shown partially retracted toward the terminal 11. Safety zones may be defined in the ramp area 10 where it is safe for aircraft to move. Boundaries of defined safety zones may be marked on the tarmac. Dashed lines 24, for example, may represent the outer boundaries of a gate 15 where aircraft 14 is parked and being serviced. The gate width between the dashed lines 24 should provide sufficient wing tip between aircraft 14 and aircraft 12 to avoid contact as aircraft 14 is maneuvered into and out of the gate 15. Other safety zones, such as a vehicle service road 26, may also be defined and marked on the ramp surface.

FIG. 1 also shows an optimum pushback travel path 28 for the aircraft 20. The pushback travel path 28 may extend through the ramp area 10 to a pushback end location 29 outside the ramp area. The pushback end location 29 may also be in an uncongested part of the ramp area. When aircraft are pushed back with tugs to a pushback end location where the aircraft engines are started for taxi to a takeoff location, jet blast and other hazards associated with operating aircraft engines require a pushback end location that is well beyond the ramp area. When aircraft are driven during pushback with electric taxi drive systems, however, these hazards do not exist, and the pushback end location 29 may be in an uncongested part of the ramp area. The pushback end location 29 may be different for different aircraft and may also depend on the configuration of the ramp area. The pushback travel path 28 shown in FIG. 1 is a substantially straight pushback path, with a slight curve. The direction of the slight curve in the pushback travel path 28 represents the direction the aircraft 20 will need to turn to head toward an assigned taxiway or runway for takeoff. When aircraft are driven during pushback with electric taxi drive systems, the pushback travel path may be curved or perpendicular to the terminal 11, in which case the aircraft will travel in reverse in a straight line to the pushback end location.

FIG. 1 also shows, in outline, ground service equipment 30 and ground vehicles 32 servicing aircraft 14 at gate 15. Similar ground service equipment and vehicles are not shown, but may also be present around aircraft 12 prior to pushback.

Figure 2:
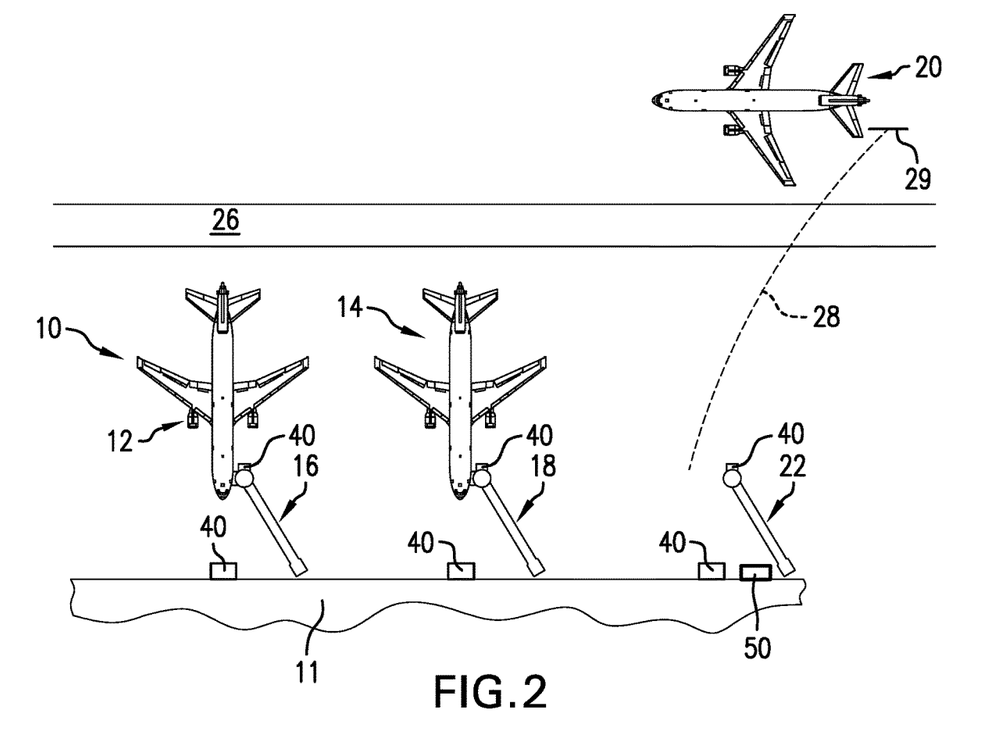
FIG. 2 shows the airport ramp area of FIG. 1 with the electric taxi system-driven aircraft guided along a pushback path with the integrated pushback guidance system of the present invention to a pushback end location and turned to taxi toward takeoff.

FIG. 2 shows the electric taxi system-driven aircraft 20 turned to taxi toward takeoff after being guided with the integrated pushback guidance system of the present invention along the optimum pushback path 28 through the ramp area to the pushback end location 29. The optimum pushback path 28 may be determined to be optimum for the airport conditions, for the electric taxi system-driven aircraft, or both and may also take into account the factors discussed above. As noted, an optimum pushback path for an electric taxi system-driven aircraft may be shorter than for an aircraft pushed back with a tug. The ground service vehicles and equipment are not shown in FIG. 2.

The integrated pushback guidance system of the present invention may include one or more monitoring devices 40, which are indicated schematically at 40 in FIGS. 1 and 2. The monitoring devices 40 are preferably positioned at the terminal 11 to scan a maximum part of the ramp area from each gate, such as gate 15, or each parking location where electric taxi-driven aircraft are to be monitored and guided during pushback. The monitoring devices 40 should scan at least the parked departing aircraft and the ramp area adjacent to the departing aircraft's optimum pushback travel path as the aircraft is driven in reverse with the electric taxi drive systems from the terminal along the optimum pushback travel path to the pushback end location. Real time and other information relating to the specific pushback travel path of the aircraft, the direction in which the aircraft must turn as it is being driven in reverse along the optimum pushback travel path, the distance to the pushback end location, and the presence of obstacles in the optimum pushback travel path or within safety zones may be transmitted to a processor. The transmitted information is processed with suitable analytical software by the processor, and then communicated in real time to one or more display devices, advantageously in the form of real time visual signals that are visible to and may be easily and quickly read by an aircraft pilot or crew and by airport personnel with access to display devices. Based on the visual signals representing and describing the pushback process in real time, the pilot may control the electric taxi drive systems to drive the aircraft as required to continue pushback along an optimum pushback travel path, alter pushback travel so that the aircraft returns to an optimum pushback travel path for the aircraft, or, if necessary, to avoid a collision or other adverse incident, stop the pushback process. A processor operative to perform the functions described herein (not shown) may be located in a convenient location in the airport terminal 11 or in other locations where information from the monitoring devices 40 may be communicated in real time.

The monitoring devices 40 may be monitoring devices that employ infrared and three-dimensional LiDAR scanning technology with a radar sensor, such as those used by ADB Safegate in their Safedock X Advanced Visual Docking Guidance System to ensure that arriving aircraft dock safely at stands. Other monitoring devices with equivalent scanning capabilities may also be used. These Safedock systems may be able to detect aircraft pushback movement that has not been authorized to alert controllers of unauthorized aircraft movements. These systems do not monitor and guide electric taxi system-driven or other aircraft during a pushback process that moves aircraft along an optimum pushback path through a ramp area to a pushback end location. The locations of monitoring devices 40 on the airport terminal 11 and on the passenger loading bridges are intended to be exemplary; other locations for the monitoring devices 40 may be more effective at different airports with different ramp configurations.

Figure 3:
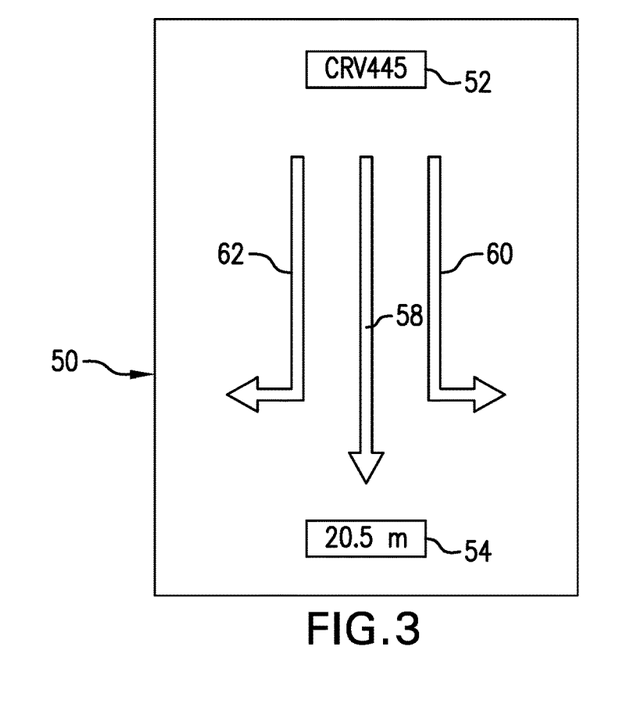
FIG. 3 shows one embodiment of a pushback guidance system display device according to the present invention.

FIG. 3 shows one embodiment of a pushback monitoring and guidance system display device 50 according to the present invention. As noted above, information from the monitoring devices 40 is processed in real time, processed, and then communicated in real time to the display device 50, where the processed information is presented in the form of lighted visual signals that may be easily and quickly read by a pilot or by other aircraft and airport personnel viewing the display device 50. The display device 50 may take different forms, depending in part on where it is to be used. A display device 50 that is approximately the size of a computer tablet and that may be wirelessly connected to a processor may optionally be used in an aircraft cockpit. Visual signals relating to aircraft pushback travel and safety generated by the system may be transmitted to this optional cockpit display. This size of display may also be useful to air traffic control personnel and ground personnel, although larger display devices may be preferred. A display device 50 that is to be mounted on an exterior surface of the terminal 11, as shown in FIG. 2, or in another exterior ramp location, for example on or adjacent to a passenger loading bridge, should be a size that is easily visible to ramp personnel on the ground and also to aircraft cockpit personnel. The information on the display should also be clearly visible to aircraft pilots and cockpit crews as well as ramp ground personnel.

The specific information and lighted visual signals displayed on the display device 50 may be different for ramp areas at different airports and may also be arranged differently than shown in FIG. 3. The display device should preferably include aircraft identification information 52, which may range from the aircraft flight number to a specific aircraft identification number to any identifying information that the airport or airline typically uses to identify aircraft. The distance to the pushback end location 29 is also preferably included, such as at 54, and may be in meters, as shown, feet, or another unit of measurement customarily used at the airport. An array of arrows may be provided to indicate the reverse direction of pushback travel of the aircraft as it is driven in reverse by the electric taxi drive system. At least one arrow 58 may indicate a straight path pushback travel direction, one arrow 60 may indicate turning in a direction to the right, and another arrow 62 may indicate turning in a direction to the left. The arrows 60 and 62 may have the angular shape shown, or may be curved, to indicate and communicate that the aircraft should be steered to turn right or to left, as indicated when the right arrow or the left arrow is lighted. Other configurations of arrows or similar directional representations may also be used to communicate this information on the display 50.

The display device 50 may also be configured to communicate safety alerts during the electric taxi system-driven aircraft pushback process as the aircraft is monitored with the monitoring devices 40. For example, if the pushback process is proceeding smoothly and the aircraft is being driven with the electric taxi system along the optimum pushback travel path, all of the lighted visual information on the display device may be a green color to indicate that all is well, and the pilot can safely continue to drive the aircraft with the electric taxi drive systems along the pushback travel path. If the monitoring device 40 identifies a previously unrecognized object entering the aircraft's safety zone, the lighted visual information may be an orange color to indicate a warning, and that the pushback travel path may need to be altered. An orange lighted right turn arrow 60 indicates that the aircraft needs to turn right and an orange lighted left turn arrow 62 indicates that the aircraft needs to turn left to alter the pushback travel path. If an object actually intrudes into the aircraft's safety zone and presents a hazard to continued pushback travel, all of the lighted visual information on the display device may turn a red color, indicating that the pushback process should be stopped immediately.

The visual warnings could be combined with audible warnings, particularly for the orange and red levels of visual warnings. Other information and safety warnings that the airport or the airline considers to be helpful to the electric taxi system-driven aircraft pushback process may also be included in the display device 50.

In addition to the display devices mounted in exterior ramp locations, portable display devices may be supplied to those airport personnel, specifically air traffic control personnel and ground or ramp personnel, with responsibility for directing and conducting the pushback process so that they may access the display device information from this convenient source. The ground service equipment and vehicles 30 and 32 at a gate, such as those at gate 15 in FIG. 1, may also be equipped with the display devices 50. The pushback monitoring and guidance system and method of the present invention may also function as a collision avoidance system, particularly when the display devices 50 with the monitoring information are made available to aircraft cockpits, ground service equipment and vehicles, and ramp personnel.

An automated dead man or kill switch that stops further movement of a ground service vehicle or a piece of ground service equipment may also be provided to prevent collisions of the ground service vehicles with aircraft or with other ground service vehicles or equipment in the aircraft's direction of travel along the optimum pushback travel path. A similar dead man or kill switch that inactivates the electric taxi drive system may also be provided to identified ramp personnel so that pushback travel of the aircraft may be stopped by inactivating the electric taxi drive system to prevent an imminent collision.

As discussed above, the pushback guidance system of the present invention may be integrated with existing ramp monitoring systems to monitor progress of electric taxi system-driven aircraft as they are driven in reverse by pilots along optimum ramp pushback paths from parking locations to pushback end locations. Airport ramp or ground personnel using the visual signals on ramp display devices or portable display devices may monitor aircraft reverse travel along the ramp pushback paths and may communicate with the pilot to guide the reverse progress of the electric system taxi-driven aircraft as needed during pushback to ensure that pushback is conducted as safely and efficiently as possible.

Figure 4:
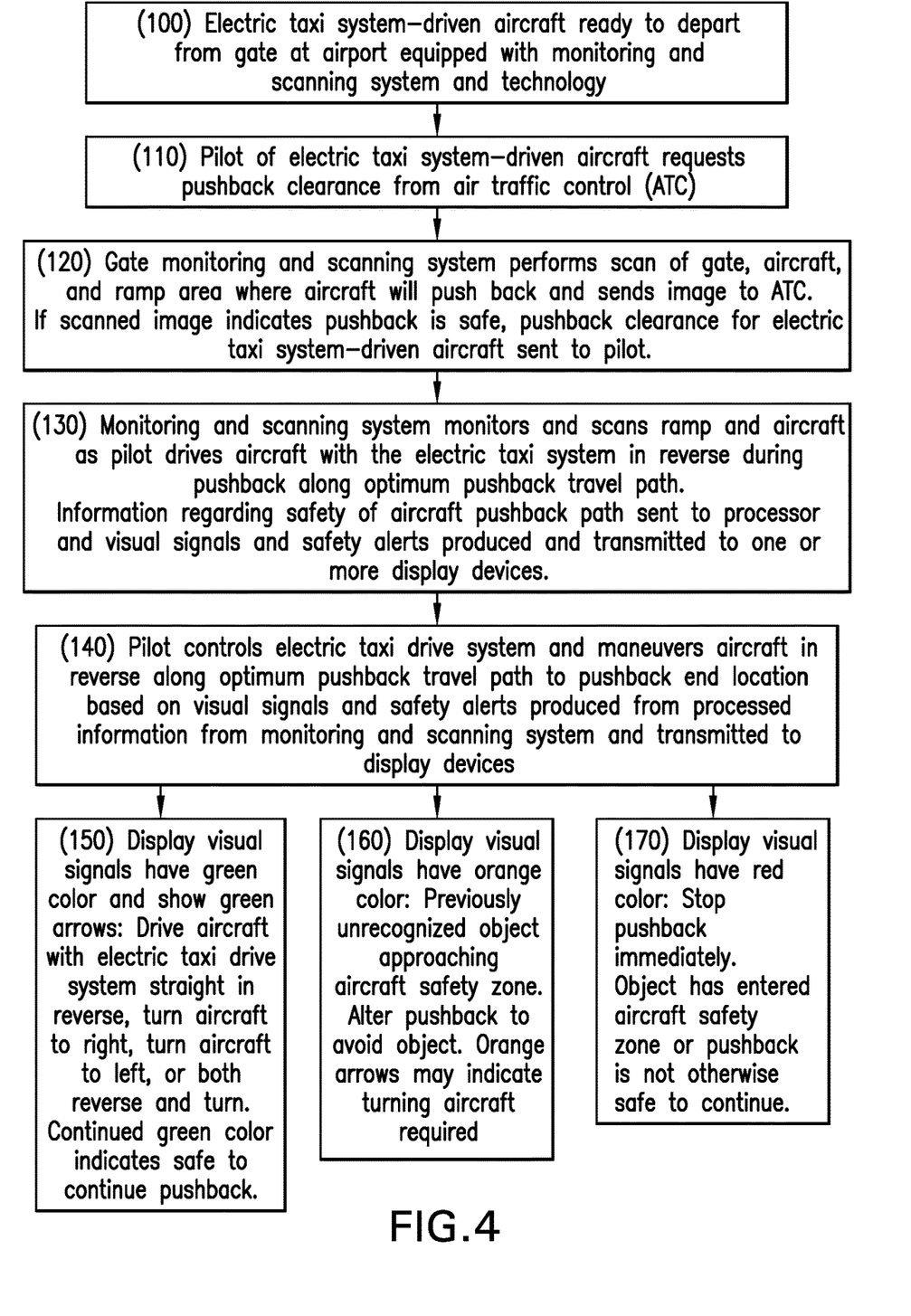
FIG. 4 is a flow chart describing the integrated pushback guidance method of the present invention.

FIG. 4 is a flow chart describing the integrated pushback guidance method of the present invention. The integrated pushback guidance method of the present invention is most effectively conducted at an airport where the aircraft gates or stands are equipped with aircraft docking systems, for example the Advanced Visual Gate Docking System Safedock X available from ADB Safegate. This system monitors approach accuracy as an arriving aircraft is moved into an assigned gate with thrust from at least one engine. Visual displays that communicate docking information to pilots of the arriving aircraft and to ramp personnel are positioned in ramp locations outside aircraft. The integrated pushback guidance method of the present invention preferably employs scanning and monitoring technology mounted at or near a gate or other parking location to guide pushback of aircraft equipped with pilot-controllable landing gear wheel-mounted electric taxi drive systems that are driven in reverse by the aircraft pilot without using tugs or aircraft engines. In step 100, the electric taxi system-driven aircraft is ready to depart from a gate at the airport equipped with a monitoring and scanning system and technology. In step 110, the pilot of the electric taxi system-driven aircraft requests pushback clearance from Air Traffic Control (ATC). In step 120, the gate and adjacent ramp area, including the aircraft, are scanned, preferably with a three-dimensional LiDAR-based scanning system, and an image of the scanned area is sent to ATC. If the scanned image indicates it is safe for the aircraft to push back, ATC grants the requested pushback clearance to the pilot. In step 130, the ramp area and aircraft are monitored and scanned with the scanning system, information relating to the presence of obstacles and other aspects of the safety of the pushback travel path is sent to a processor, and visual signals and safety alerts are produced from this processed information and transmitted to one or more display devices, such as that shown in FIG. 3. As noted above, the display devices may be located in, for example, in ramp ground locations exterior to the aircraft, in air traffic control and ramp or ground control locations, and, optionally, in the aircraft cockpit and inside ground service vehicles and equipment. In step 140, the pilot controls the electric taxi system to maneuver the aircraft in reverse with the electric taxi system along an optimum pushback path to a pushback end location based on the transmitted visual signals and safety alerts produced from the processed information obtained from the scanning system that appear on the display devices. A distance count down from the pushback end location where it is safe to turn the aircraft and drive forward to a takeoff location is also transmitted to the display devices and may be used in guiding the pushback process.

Steps 150, 160, and 170 describe the visual signals and safety alerts for each of three situations that may be encountered as the pilot maneuvers the electric taxi system-driven aircraft during pushback. In step 150, the visual signals on the display device have a green color, and one of three arrows may be lighted in green to indicate direction of pushback travel and that pushback travel may be continued in the direction of the arrow. A green straight arrow indicates that it is safe to continue pushback travel along in reverse along a straight reverse path. A green right turn arrow indicates that it is safe to turn the aircraft in a direction to the right of the pushback travel path, and a green left turn arrow indicates that it is safe to turn the aircraft in a direction to the left of the pushback travel path. The green visual signals indicate that the pilot may continue to maneuver the aircraft with the electric taxi drive system as indicated by the arrows. In step 160, the visual signals on the display device have an orange color, indicating that the processed information from the scanning system has detected a previously undetected object approaching the aircraft's safety zone, and the pilot may need to control the electric taxi drive system to alter pushback. The color of one or more of the arrows may indicate that continuing in reverse, that turning right, and/or that turning left may only be done with caution. In step 170, the visual signals on the display have a red color, indicating that the processed information from the scanning system has detected entry of an object into the aircraft's safety zone and that pushback must be stopped immediately. Objects, such as other aircraft, ground service vehicles and equipment, and ramp personnel, approaching or entering an aircraft's safety zone are the main reasons the visual signals may indicate stopping or altering pushback. The system may be adapted to allow input of other information, for example from air traffic control, that may require adjustment of, or even stopping, pushback travel.

When, as described above, all of the ground service vehicles and equipment operating at the same gate as the electric taxi drive system-equipped aircraft are equipped with the display devices and with automated deadman or kill switches, the integrated pushback guidance system of the present invention may function as an anti-collision system.

Further, the electric taxi drive system could be connected to the pushback guidance system, for example through the processor described above, and artificial intelligence or machine learning algorithms may be adapted to automatically control operation of the electric taxi drive system in response to the visual signals and safety alerts.

While the present invention has been described with respect to preferred embodiments, this is not intended to be limiting, and other arrangements and structures that perform the required functions are contemplated to be within the scope of the present invention.

INDUSTRIAL APPLICABILITY

The integrated pushback monitoring and guidance system and method of the present invention will find its primary applicability in improving safety and efficiency of aircraft pushback operations at airports where gates are equipped with docking systems, particularly at airports with high traffic and congested ramp areas and where aircraft are driven with electric taxi drive systems during pushback.

The invention claimed is:

1. An integrated pushback travel monitoring and guidance method for departing electric taxi drive system-driven aircraft at airports with ramp monitoring and docking systems, comprising:
   a. at an airport with a ramp area having parking locations for aircraft equipped with electric taxi drive systems, determining, for each equipped aircraft, an optimum pushback travel path from the equipped aircraft parking location to a pushback travel path end location outside the ramp area or within uncongested areas of the ramp, the optimum pushback travel paths being determined for airport ramp conditions, the specific equipped aircraft, or both the airport ramp conditions and the specific equipped aircraft;
   b. providing pushback scanning systems and monitoring devices positioned at the equipped aircraft parking locations operative to scan and monitor a maximum part of the ramp area from each equipped aircraft parking location, a parked departing equipped aircraft, and a ramp area adjacent to a departing equipped aircraft as each departing equipped aircraft is driven in reverse with the electric taxi drive systems along an optimum pushback travel path from a parking location to a pushback end location;
   c. requesting pushback clearance for a departing equipped aircraft, scanning and producing an image with the departing equipped aircraft's parking location, the departing equipped aircraft, and the ramp area with the departing equipped aircraft's optimum pushback travel path, and determining safety and clearance for pushback from the image;
   d. maneuvering a departing equipped aircraft cleared for pushback in reverse along the optimum pushback travel path, simultaneously scanning and monitoring the ramp and equipped aircraft with the pushback scanning systems and monitoring devices, generating real time information relating to safety of equipped aircraft reverse travel along the optimum pushback travel path, and transmitting the generated information to a processor operative to produce and transmit visual signals and safety alerts to one or multiple display devices; and
   e. in response to the transmitted visual signals and safety alerts, continuing to maneuver or not continuing to maneuver the departing equipped aircraft with the electric taxi drive systems along the optimum pushback travel path to the pushback travel path end location.

2. The method of claim 1, wherein said one or multiple display devices comprise a plurality of individual electronic display devices in communication with the processor to receive the transmitted visual signals and safety alerts, and ones of said plurality of individual electronic display devices are located in at least a cockpit of said aircraft and in airport control locations with personnel responsible for aircraft pushback operations or airport ramp operations.

3. The method of claim 1, further comprising detecting a presence of objects along the optimum pushback travel path in the generated real time information transmitted to the processor, communicating the visual signals and safety alerts to the one or multiple display devices based on the detected presence of objects, and continuing reverse travel of the equipped aircraft with the electric taxi systems along the optimum pushback travel path, turning the reversing equipped aircraft in a direction required to avoid the detected presence of objects, or stopping reverse travel of the equipped aircraft in response to the real time information communicated by the visual signals and safety alerts.

4. The method of claim 1, further comprising locating and sizing the one or multiple display devices in airport ramp locations outside the aircraft where a pilot and cockpit crew of the equipped aircraft can easily see, read, and respond to the visual signals and safety alerts in real time as they maneuver the aircraft in reverse with the electric taxi drive systems along the optimum pushback travel path to the pushback travel path end location.

5. The method of claim 4, further comprising locating multiple ones of the display devices in multiple locations inside and outside the electric taxi system-driven aircraft, including inside a cockpit of the electric taxi system-driven aircraft and outside the electric taxi system-driven aircraft at parking locations, in airport ramp control and air traffic control locations, and within ground service vehicles and equipment where airport personnel can easily read the display devices and guide a pilot to drive the equipped aircraft with the electric taxi systems in reverse along the optimum pushback path in response to the visual signals and safety alerts.

6. The method of claim 5, wherein the visual signals displayed on the one or multiple display devices comprise at least a trio of directional arrows indicating left, right, and straight travel directions and the safety alerts comprise colors, wherein the colors red and orange correspond, respectively, to a presence and a warning of an unsafe pushback condition and the color green corresponds to an absence of an unsafe pushback condition.

7. The method of claim 6, wherein the one or multiple display devices comprises planar structures, the visual signals and safety alerts are presented on a planar surface of the planar structures, and the planar structures are sized and mounted in locations outside the electric taxi system-driven aircraft to be clearly visible to a pilot inside a cockpit of the electric taxi system-driven aircraft while the pilot is maneuvering the equipped aircraft with the electric taxi drive systems along the optimum pushback travel path.

8. The method of claim 7, further comprising providing a distance indicator operative to indicate a real time distance between a location of the electric taxi system-driven aircraft along the optimum pushback travel path away from said pushback end location during reverse pushback travel.

9. The method of claim 6, wherein the trio of directional arrows comprise arrows indicating electric taxi system-driven aircraft reverse pushback travel along a straight pushback travel path, reverse pushback travel requiring turning to the right, and reverse pushback travel requiring turning to the left.

10. The method of claim 1, further comprising, at an airport with parking locations equipped with aircraft docking systems for identifying and docking arriving electric taxi system-driven aircraft, integrating the pushback scanning systems and monitoring devices with the aircraft docking systems and monitoring both ground travel of arriving electric taxi system-driven aircraft into the parking locations and pushback of departing electric taxi system-driven aircraft out of the parking locations and along the optimum pushback travel paths to the pushback travel path end locations.

* * * * *